United States Patent [19]

Rippel

[11] 4,384,321

[45] May 17, 1983

[54] UNITY POWER FACTOR SWITCHING REGULATOR

[75] Inventor: Wally E. Rippel, Altadena, Calif.

[73] Assignee: California Institute of Technology, Pasadena, Calif.

[21] Appl. No.: 240,453

[22] Filed: Mar. 4, 1981

Related U.S. Application Data

[63] Continuation-in-part of Ser. No. 144,834, Apr. 29, 1980.

[51] Int. Cl.³ .............................................. H02M 7/00
[52] U.S. Cl. ..................................... 363/124; 320/21; 320/43
[58] Field of Search .................... 320/21, 39, 40, 43, 320/50, DIG. 1, DIG. 2; 363/124

[56] References Cited

U.S. PATENT DOCUMENTS

| 3,696,286 | 10/1972 | Ule | 320/40 X |
| 4,084,103 | 4/1978 | Burns et al. | 363/124 X |

FOREIGN PATENT DOCUMENTS

| 2558135 | 7/1976 | Fed. Rep. of Germany | 363/124 |
| 2602789 | 7/1977 | Fed. Rep. of Germany | 320/21 |
| 2390843 | 1/1979 | France | 320/21 |

Primary Examiner—William M. Shoop
Attorney, Agent, or Firm—Freilich, Hornbaker, Wasserman, Rosen & Fernandez

[57] ABSTRACT

A single or multiphase boost chopper regulator operating with unity power factor, for use such as to charge a battery is comprised of a power section for converting single or multiphase line energy into recharge energy including a rectifier (10), one inductor (L₁) and one chopper (Q₁) for each chopper phase for presenting a load (battery) with a current output, and duty cycle control means (16) for each chopper to control the average inductor current over each period of the chopper, and a sensing and control section including means (20) for sensing at least one load parameter, means (22) for producing a current command signal as a function of said parameter, means (26) for producing a feedback signal as a function of said current command signal and the average rectifier voltage output over each period of the chopper, means (28) for sensing current through said inductor, means (18) for comparing said feedback signal with said sensed current to produce, in response to a difference, a control signal applied to the duty cycle control means, whereby the average inductor current is proportionate to the average rectifier voltage output over each period of the chopper, and instantaneous line current is thereby maintained proportionate to the instantaneous line voltage, thus achieving a unity power factor. The boost chopper is comprised of a plurality of converters connected in parallel and operated in staggered phase. For optimal harmonic suppression, the duty cycles of the switching converters are evenly spaced, and by negative coupling between pairs 180° out-of-phase, peak currents through the switches can be reduced while reducing the inductor size and mass.

17 Claims, 12 Drawing Figures

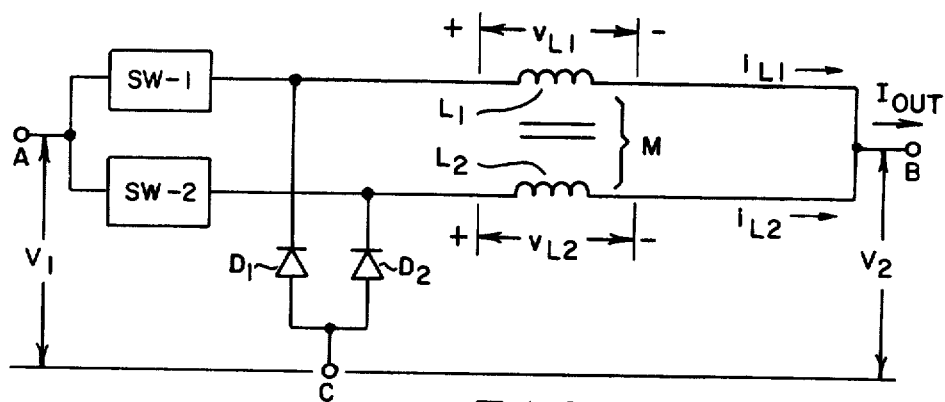
FIG. 9
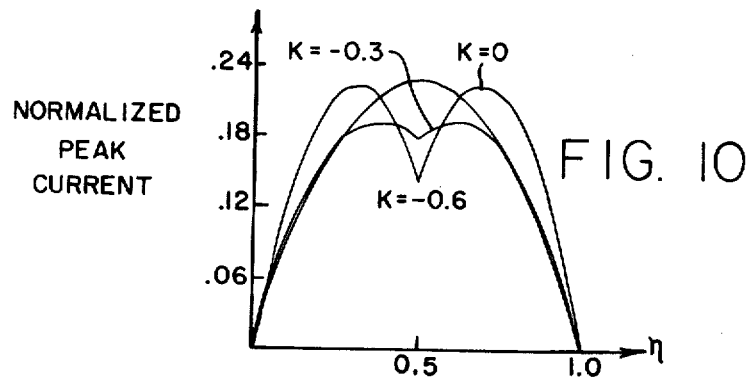
FIG. 10
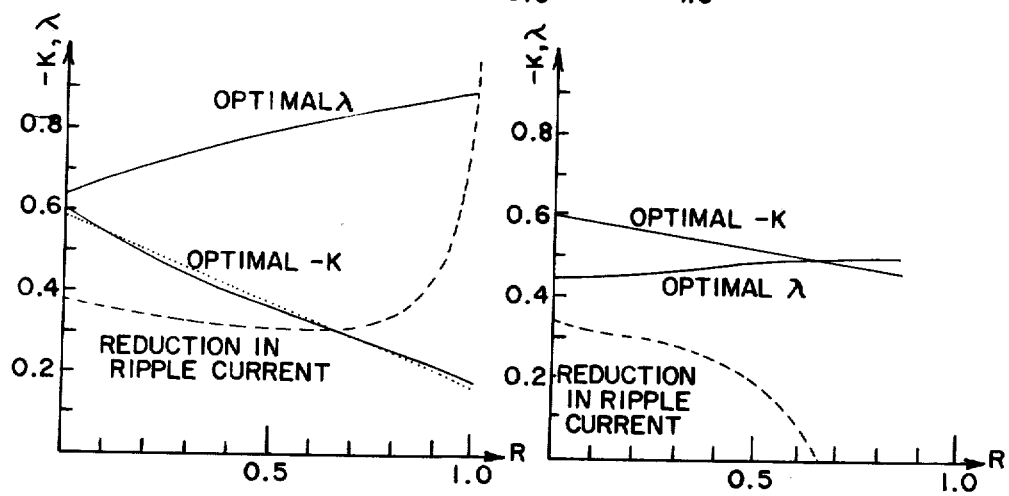
FIG. 11
FIG. 12

UNITY POWER FACTOR SWITCHING REGULATOR

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

This application is a continuation in part of application Ser. No. 144,834 filed Apr. 29, 1980.

BACKGROUND OF THE INVENTION

This invention relates to power converters, particularly to that type of converter having a separate inductor with each of a plurality of choppers that are paralleled to form a multiphase chopper, and more particularly, though not limited to, a switching regulator operating with unity power factor for charging batteries.

There has been significant effort to develop viable passenger electric vehicles as one means of displacing future petroleum demand. To date, research and development emphasis has centered on battery and propulsion system technologies; little attention has been given to the battery charger. Production (off-the-shelf) battery chargers have the following typical characteristics:

1. Considerable Weight—typically 25 kg per kW of output.
2. Low Efficiency—typically 70% over the charge cycle.
3. Low Power Factor—typically 80% at full power.
4. Crude Control—maximum line current drawn not accurately limited; charge algorithm not adaptive to needs of battery.
5. Moderate Cost—typically $200 per kW.

Relative to an ideal charger, these characteristics significantly degrade both the performance and economy of passenger vehicles employing onboard chargers. It would be desirable to have as an ideal battery charger, one with significant improvement in each of these characteristics. The present invention based on a pulse width modulated chopper comes very close to achieving the ideal characteristics, namely a light weight, high efficiency battery charger which would achieve a near unity power factor at a low cost, and with insensitivity to line transients. However, although providing such a battery charger was the motivation for the present invention, it should be understood that any regulator involving alternating current would benefit from the present invention to enable operation with very near unity power factor. In fact, all applications of choppers used in power conditioning would benefit from the invention, such as line operated dc power supplies and line powered controllers for dc motors.

While conventional multiphase (two or more phase) switching converters significantly lower input and output ripple, compared to single-phase switching converters, they improve neither inductor nor switching device utilization. Consequently, another feature of the invention is to improve inductor and device utilization, and to reduce inductor losses.

SUMMARY OF THE INVENTION

In accordance with the present invention, a regulator with unity power factor may be divided into two main sections—a power section which converts AC line energy into load energy, and a sensing and control section which senses one or more load parameters and generates a command signal which controls the load power in accordance with sensed parameters. This second section may utilize a digital processor to generate the required control function. Line power is rectified by a suitable rectifier, such as a diode bridge rectifier, coupled by an inductor to a chopper switch and switching diode. A capacitor filters the output of the diode switch and presents the load with dc power. Control of the duty cycle for the chopper is such that the average inductor current over each period of the chopper is proportionate to the average rectifier voltage output during the same time period. In this way, the instantaneous line current is maintained proportionate to the instantaneous line voltage—thus effecting regulation with a unity power factor. High frequency, chopper-generated, ripple currents are bypassed from the rectifier output by a filter coupling the rectifier to the inductor. Multiphase choppers using a multiplicity of inductors, switches and diodes may be used to further reduce ripple currents. A load sensor senses at least the voltage parameter of the load and, through a control processor, provides a signal which, when multiplied by the rectifier output voltage, $v_1$, in a single quadrature multiplier, produces a product signal that is compared with the inductor current, $i_L$. The difference between the compared signals then controls the duty cycle of the chopper switch. In that manner, the switching duty cycle is controlled such that the average current through the inductor is maintained proportionate to the average rectifier output voltage over each chopper period, such that $<i_L> = K<v_1>$, where K is the proportionality constant (at full power) determined by the drive circuit comprised of the multiplier and comparator. This results in a line current which is sinusoidal and in phase with the line voltage. As an additional feature, a line voltage compensator may be provided, such as an automatic gain control circuit or a phase-locked loop and full-wave rectifier, to maintain the rectified line voltage into the multiplier more nearly constant with respect to line voltage fluctuations. Either single phase or multiphase line voltage may be used, and a single or a polyphase chopper may be used. The use of a polyphase chopper reduces the amplitude of ripple currents and raises the fundamental ripple current frequency which affords added ease in filtering both the input and the output of the boost chopper.

Ripple through the inductors of this or any multiphase chopper may be further reduced by negative coupling between inductors. A conventional chopper comprised of a switch, an inductor and a diode, all three connected to a common node, will function as a boost, buck-boost or buck converter, depending on which of two devices have their other terminal common to the input and output. A number of these choppers may be provided in parallel in any of these configurations for a multiphase converter, in which case the inductors of different phases may be negatively coupled to reduce ripple and thereby improve the inductor and switching device utilization. An E-I core structure may be used to negatively couple the inductors with each inductor having part of its turns on the outer legs, and the rest of the turns on the center leg. In a preferred structure, gaps are provided at only the end legs.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 9 illustrates a two-phase switching converter with negative coupled inductors.

FIG. 10 is a plot of normalized peak current vs duty cycle, $\eta$, and coupling coefficient K. For $\eta < 0.5$, data is from equation 21a and for $\eta > 0.5$, data is from equation 21b.

FIG. 11 illustrates values of coupling coefficient, K, and turns ratio, $\lambda$, for an optimal two-gap coupled inductor shown in FIG. 8a.

FIG. 12 illustrates values of coupling coefficient, K, and turns ratio, $\lambda$, for an optimal three-gap coupled inductor shown in FIG. 8b.

DESCRIPTION OF PREFERRED EMBODIMENTS

Figure 1:
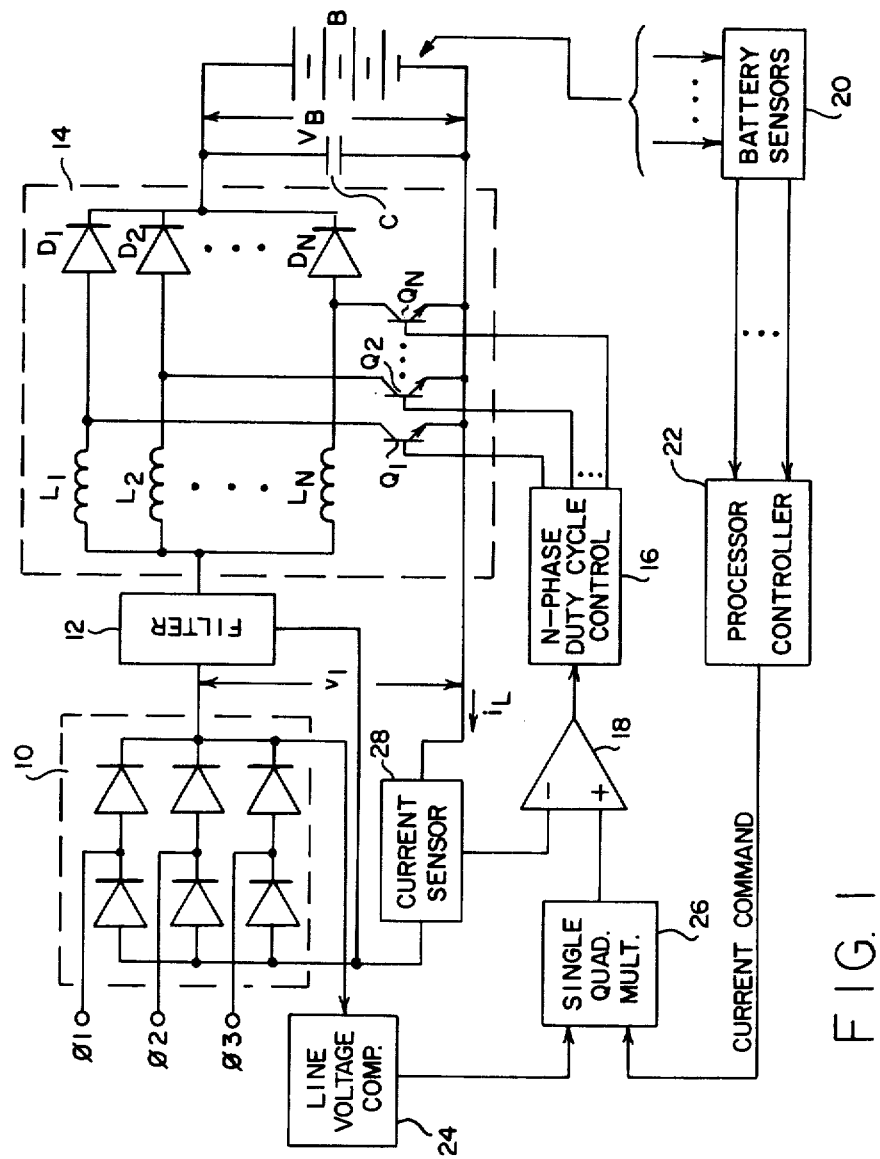
FIG. 1 is a schematic diagram of a polyphase boost chopper with modulated duty cycle for operation with three phase line voltage in accordance with the present invention. The line voltage could be reduced to a single phase, and the chopper could also be reduced to a single phase, by simply omitting provision for the other phases shown. The number of chopper phases can be selected independently of line phases.

The first feature of the invention, which relates to ac-to-dc power regulator shown by way of example as a boost chopper battery charger, and more particularly to that type of regulator operating with unity power factor, will now be described with reference to FIG. 1. It illustrates an exemplary application of the present invention for charging a battery B from three-phase line voltage utilizes a diode bridge 10 for full wave rectification of the line voltage and a filter 12 to reduce current ripple fed back to the diode bridge. A polyphase boost chopper 14 comprised of inductors, $L_1$-$L_N$, chopper switches $Q_1$-$Q_N$, and diodes, $D_1$-$D_N$, boosts the rectified line voltage and provides greatly reduced input ripple currents by harmonic cancellation. The fundamental ripple current frequency is raised by a factor of N, which makes input filtering with filter 12 and output filtering with capacitor C easier. Also electromagnetic interference (EMI) and spiking are reduced due to smaller current steps. However, this feature of the invention can be operated with a single phase boost chopper, where the additional advantages of a polyphase boost chopper would be lost. The present invention could also be used with single phase line voltage with a polyphase or single phase boost chopper.

Line voltage is rectified by the bridge rectifier 10 and boosted as needed by the boost chopper 14 so that current is delivered to the battery. Control of the chopper duty cycle is by a multiphase (N-phase) duty cycle control unit 16 which receives a pulse width modulation control signal from a comparator (differential amplifier) 18 to control pulse width, as with a monostable multivibrator having an electronically controlled on time. The multivibrator is repeatedly triggered by clock pulses to produce N phase-staggered on pulses that are sequentially multiplexed to the N switches $Q_1$ through $Q_n$. Other equivalent arrangements could be devised by those skilled in the art, but a preferred embodiment is described hereinafter.

Battery sensors sense battery parameters, such as charge voltage, current and temperature, and a processor controller 22 operates on these sensed parameters to produce a control signal to provide an optimal recharge current-time profile to the battery. This profile may be computed from theory, or determined empirically.

Figure 2:
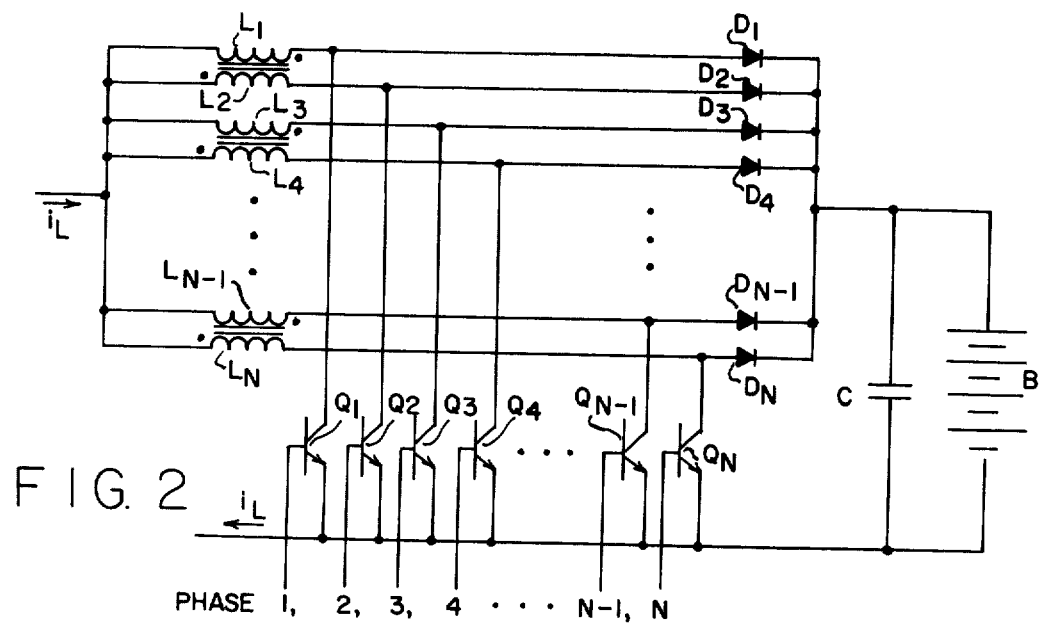
FIG. 2 illustrates coupled inductors for the circuit of FIG. 1 to reduce ripple.
Figure 3:
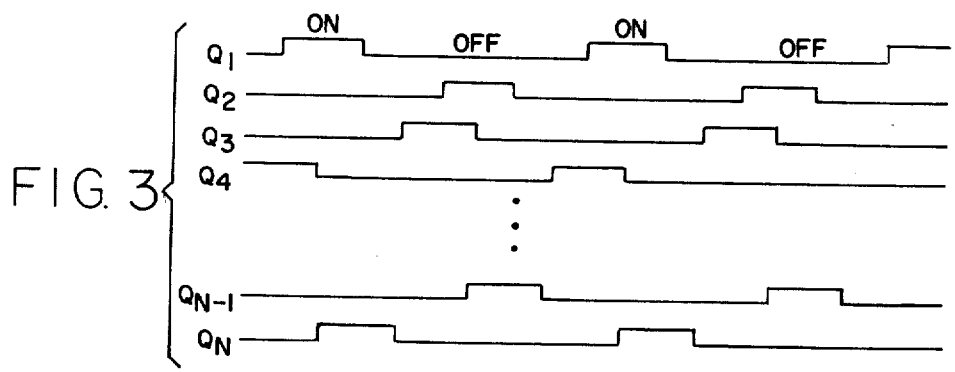
FIG. 3 illustrates an exemplary timing sequence for the N-phase duty cycle control circuit in FIG. 1.

Although the present invention could be practiced with a single phase chopper, and even with single phase line voltage, as noted above, the polyphase chopper shown in FIG. 1 is preferred, because it provides greatly reduced input ripple currents by harmonic cancellation; the fundamental ripple current frequency is raised by a factor of N which affords added ease for filtering. EMI and spiking are reduced due to smaller current steps. To further reduce ripple, the inductors of the polyphase chopper may be negatively coupled in pairs, as shown in FIG. 2, where the switch duty cycles are provided 180° out of phase such that the on time of a given switch falls half way between the on times of the complementary switch, as shown in FIG. 3. The embodiment of coupled inductors and time staggered duty cycles just described above may be used to either reduce ripple currents in the inductors while maintaining fixed inductor sizes, or alternatively to enable down-sizing of the inductors while maintaining fixed values of the ripple currents.

Figure 4:
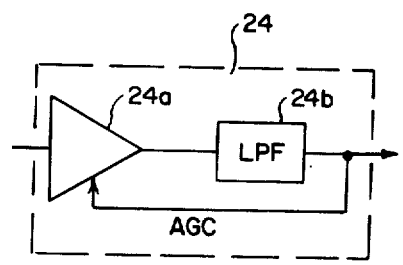
FIG. 4 illustrates one variant for the line voltage compensator circuit of FIG. 1.
Figure 5:
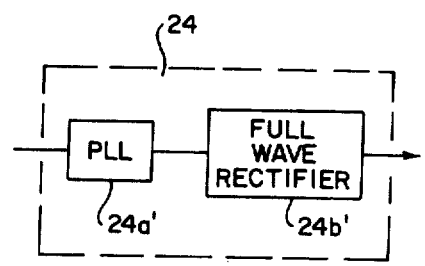
FIG. 5 illustrates another variant for the line voltage compensator in FIG. 1.

The rectified line voltage, $v_1$, is maintained more nearly constant by a line voltage compensator 24, such as an automatic gain control (AGC) circuit comprised of an amplifier 24a and low pass filter (LPF) 24b, shown in FIG. 4, or a circuit comprised of a phase-locked loop (PLL) 24a' and full-wave rectifier 24b' shown in FIG. 5. Since the output of the PLL is a sinusoid, full wave rectification is required to obtain a waveform similar to $v_1$. Fluctuations in line voltage are thus compensated in the line voltage signal applied to a single quadrant multiplier 26 which yields a signal that is equal to the product of the line voltage and the control signal from the processor controller 22. The product signal is then compared with the input current $i_{in}$ sensed by a current sensor 28, and the difference is applied to the duty cycle control unit to modulate the pulse width of pulses periodically produced for operation of the boost chopper.

The switching duty cycle is controlled such that the average current through the inductor is maintained proportionate to the average rectifier output voltage over each chopper period, or:

$$<i_L> = \kappa <v_1>, \qquad (1)$$

where $<>$ denotes an average value, and $\kappa$ is the proportionality constant (at full power) determined by the drive circuit comprised of the multiplier 26 and comparator 18. This results in a line current which is sinusoidal and in phase with the line voltage for a unity power factor.

Impact of the improved battery charger of FIG. 1 may be seen by considering a typical passenger electric vehicle. Line energy consumption is 0.23 kWh/km and recharge time to 80% is 8 hours when charged by a conventional 2 kW charger which weighs 52 kg and draws 18 amps from a 115 volt line. Acceleration from 0 to 50 km/hr is 10 seconds and range is 110 km. The vehicle weight is 1300 kg. By replacing the conventional charger with a boost chopper charger, the following vehicular improvements would result:

1. Energy consumption will drop by more than 26%. If the yearly driving is 15,000 km, then the energy savings will be over 930 kWh per year—a cost savings of $37 assuming $0.04/kWh.

2. Since the recharge rate (until battery limits) is proportionate to the product of line current drawn, charger efficiency, and power factor, the boost chopper regulator will improve the initial recharge rate by 70% and the 8 hour charge time will be cut to 4.7 hours without increasing the rms line current drawn.

3. Since each kg of propulsion weight typically requires 0.3 kg of support structure, reducing the charger weight by 49 kg will reduce the curb weight by about 64 kg. The reduced curb weight will automatically improve acceleration and urban range each by about 5%. For stop and go driving, this will also enable an added 5% in energy savings and improve recharge rate by an added 5% when expressed in km per hour of charge.

In addition to unity power factor, high efficiency and light weight, the circuit of FIG. 1 has the following "circuit-oriented" advantages:

1. The switching transistors are inherently protected from line transients. The battery and output capacitor C acts as a voltage clamp while the inductors and the filter 12 provide impedance isolation between the switching transistors and the line.

2. Transistor and inductor utilization are both good—especially when three phase input power is used. Compared with inverter and isolation type choppers, only about one fourth the voltage-ampere worth of transistors is required.

3. The circuit is line frequency and line voltage insensitive. If the battery voltage is 360 volts or more, the circuit will be compatible with all line voltages, both single and three phase, up to 230 volts rms. Operation with dc input voltages of 360 volts and less is also possible. These features enable virtually universal operation. Lack of electrical isolation between battery and line and the requirement for battery voltage to exceed peak line voltage are the only disadvantages.

The voltage constraint, in the case of on-road vehicles charged from 115 volt lines will likely resolve automatically, as trends continue toward higher battery voltages. Furthermore, should ongoing developments of high voltage bipolar battery systems prove successful, battery voltages in excess of 360 volts will likely be employed—in which case charger compatibility with both 115 and 230 volt lines will also follow.

The lack of electrical isolation presents shock hazards and appropriate steps must be taken to insure adequate safety. The conventional solution of a transformer leads to the old problems of excessive weight, reduced efficiency and increased cost—especially where higher charger rates are called for. On the other hand, the use of high frequency isolation suffers economically in that approximately four times the voltage-ampere worth of switching transistors are required per output watt.

It appears, however, that adequate safety can be achieved (without transformer isolation) by combined use of the following:

1. Incorporation of a ground fault interrupter (GFI) in series with each of the input power lines. The GFI must be responsive to both ac and dc unbalanced current components.

2. Incorporation of interlock switches which effectively disconnect each of the input lines when access lids (such as the front hood) are opened. The interlock switches may be used to trip the GFI.

3. Grounding of the vehicle body during recharge via a standard ground conductor within the line cable.

4. Appropriately insulating all battery terminals and other electrical conductors from possible human contact. This will undoubtedly be required for all "higher voltage" systems regardless of charger isolation.

There are limits of accuracy to which $<i_L>$ can be made proportionate to $<v_1>$. If L is too small, ripple will be excessive and adequate filtering may be impossible, and if L is too large, the inductor current will tend to be constant over each half line cycle and the desired modulation will not be possible.

In the following discussion for either embodiment, assume that the chopping frequency ($f_c$) and the chopping period ($T = 1/f_c$) remain constant from one cycle to the next. This assumption corresponds to usual practice while enabling simplified analyses.

The criterion for minimum acceptable L and $f_c$ is arbitrary. Therefore, the conventional criterion of critical current at full power will be adopted. Accordingly, L and $f_c$ must be sufficiently large so that the inductor current will flow over the entire half line cycle.

The required values of L and $f_c$ will be calculated, assuming "quasi steady state" operation, namely:

1. $v_1$ is assumed constant over a given chopper period, T, and

2. $i_L$ is assumed equal at the beginning and end points of each chopper period.

While these assumptions are inconsistent with the modulation concept where $<v_1>$ and $<i_L>$ change from one chopper cycle to the next, the assumptions are reasonably accurate if the chopping frequency is high compared with the line frequency.

Based on these assumptions, the transistor duty cycle, $\eta$ is given by:

$$\eta = 1 - (V_1/V_B) \qquad (2)$$

where $V_B$ is the Battery Voltage.

In the critical case, $i_L = 0$ at $t = 0$ and at $t = T$; at $t = \eta T$, $i_L = v_1 \eta T/L$. The average inductor current is then given by:

$$<i_L> = \frac{V_1 \eta T}{2L} \quad \text{(critical case)} \qquad (3)$$

Equating equations (1) and (3), the minimum inductance is found as:

$$L'_{min} = \frac{\eta T}{2\kappa} = \frac{\left(1 - \frac{v_1}{V_B}\right)T}{2\kappa} \qquad (4)$$

Since $v_1$ goes to zero twice each line cycle, the inductance which insures over-critical operation over the entire line cycle is:

$$L_{min} = \frac{\eta T}{2\kappa} = \frac{1}{2\kappa f_c} \qquad (5)$$

The rate of average current rise is limited to $v_1/L$. This "slew rate" is the critical factor which limits the "tracking proportionality" between $<i_L>$ and $v_1$. Once again, an arbitrary criterion is called for.

Since the "slew rate error" occurs only during the first portion of the line voltage sine curve where voltage, current and duration are each small, the associated energy values are third order while power factor perturbations will be at least fourth order. Accordingly, if L is sufficiently small so that tracking can occur when $v_1$ is greater than $0.1\ V_p$, where $V_p$ is the peak line voltage, then the expected power factor degradation (relative to perfect tracking) will be on the order of 0.01%, which is negligible.

Since, $$v_1(t) = V_p \sin 2\pi f_l t = V_p \sin \omega_l t \qquad (6)$$

it follows that $$\frac{2\pi V_p \kappa}{T_l} = \frac{0.1\ V_p}{L_{max}} \text{ or } L_{max} = 0.0159 \frac{T_l}{\kappa} \qquad (7)$$

Note that equations (6) and (7) indicate that the minimum chopping frequency must be at least 31.4 times the line frequency, or about 2 kHz in the case of a 60 Hz line.

Figure 6:
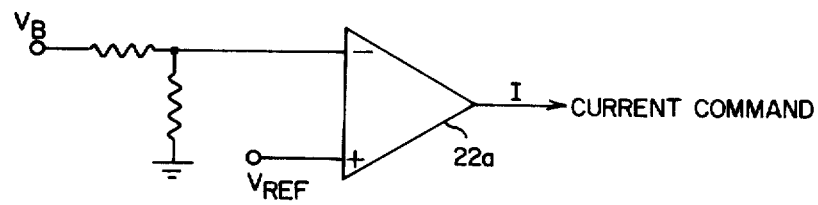
FIG. 6 illustrates an exemplary analog circuit for the processor controller of FIG. 1.
Figure 7:
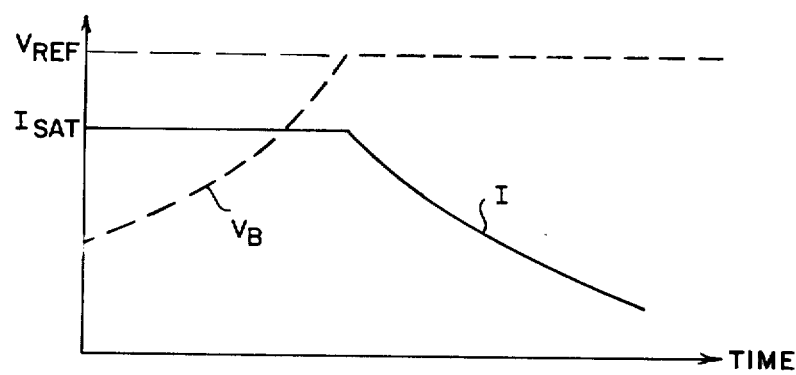
FIG. 7 is a graph useful in understanding the operation of the circuit of FIG. 6.

Although a digital microprocessor would preferably be employed to implement the processor controller 22, analog circuits may also be employed, as shown in FIG. 6, for the simple case of only the battery voltage sensed, using a saturable differential amplifier 22a of high gain to compare some fraction of the battery voltage $V_B$ to a reference voltage $V_{REF}$. The difference is a current command signal applied to the multiplier 26. FIG. 7 illustrates the typical relationship between battery voltage and current command. As long as the divided battery voltage is below the reference, the battery command is a maximum because the comparator saturates. Once the battery voltage reaches the reference, the comparator desaturates and the battery charge voltage is held constant by feedback action while the charge current tapers with time. To introduce another parameter, such as battery temperature, the reference voltage $V_{REF}$ derived from a stable source, such as a Zener diode, may be subjected to a temperature responsive attenuator, such as a thermister, to reduce the reference as the battery temperature increases.

The N-phase duty cycle control is preferably comprised of N independent pulse width modulators, one for each switch $Q_1$ through $Q_N$, controlled to have symmetrically staggered duty cycles as in FIG. 3. As each switch $Q_1$ through $Q_N$ is turned on in sequence, it is controlled to turn off by the associated pulse width modulator in accordance with a control signal from the comparator 18. The greater the difference between $<i_L>$ and $\kappa<v_1>$, where $\kappa$ is effectively established by the command signal from the processor controller, the greater the period before the switch is turned off, thus maintaining the relationship $<i_L> = \kappa<v_1>$, for unity power factor. When the battery voltage increases to the level of the reference, the signal IC decreases to decrease the duty cycle, and thus decrease current to the load. Under both conditions, the average inductor current is maintained proportionate to the average rectifier output voltage $v_1$ for unity power factor.

As noted hereinbefore, the arrangement of N-phase duty cycle control with coupled inductors shown in FIG. 2 may be used to reduce ripple currents, or to reduce the size of the inductors without increasing ripple currents. The manner in which the inductors may be negatively coupled in pairs is illustrated in FIGS. 8a and 8b.

Figure 8A:
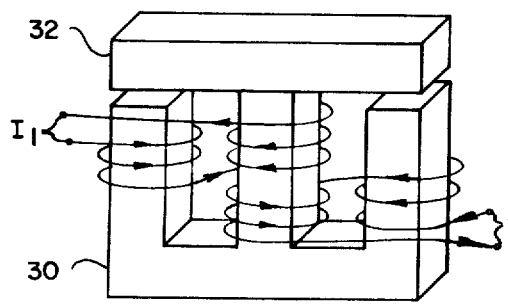
FIGS. 8a and 8b illustrate alternative structures for the coupled inductors in the circuit of FIG. 2.

The arrangement, shown in FIG. 8a, utilizes an E core 30 with a longer center leg and an I core 32 across the center leg, leaving a gap over the two outer legs. The core thus formed has two magnetic path loops, one for each outer leg sharing the center leg, with an air gap in each loop. All core cross sections are of area A and the two gaps are each of length l. One inductor consists of $N_1$ turns on the left outer leg connected in series aiding with $N_2$ turns on the center leg. The second inductor consists of $N_1$ turns on the right leg in series aiding with $N_2$ turns on the center leg. Windings are such that the two $N_2$ coils are oppositely phased.

Negative coupling is provided by the two $N_2$ coils which share the center core leg. The dc current component flowing in one inductor produces a core flux which, by action of the center leg coils partly cancels the core flux produced by the dc current component flowing in the other inductance. This partial cancellation of dc flux components enables a reduction in the air gap which in turn provides for increased inductance to reduce ripple currents, or alternatively for a size and weight reduction.

Figure 8B:
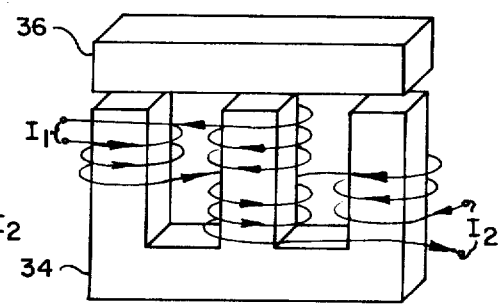

The second arrangement for coupled inductors, shown in FIG. 8b, is like the first except that the center leg of an E core 34 is of the same length as the outer legs, leaving a gap with the center leg of a length equal to the length of gaps at the outer legs, i.e., all legs are equally gapped. Windings and core cross sections are identical with those of the two-gap arrangement of FIG. 8a.

As will be noted more fully hereinafter, the two-gap structure is preferred in most cases because, for all values of ripple current, it reduces peak currents by greater amounts. The two-gap structure is also superior in that, for optimal design, equal amounts of copper are used on each of the three core legs, thus providing efficient packaging, good heat transfer and reduced copper weight and resistance.

It should be apparent from the above description that a single or multiphase boost chopper battery charger is provided operating with unity power factor. It should also be apparent that the chopper may be modified to any known boost, buck, or a buck-boost chopper, and more importantly that the unity power factor converter could be utilized to advantage for any other type of load, and therefore this first feature of the invention, although devised for charging a battery, is useful in driving any dc load from single or multiphase line energy with unity power factor. Consequently, it is intended that the claims directed to this feature be interpreted to cover such modifications and other applications.

The second feature of the invention will now be described in more detail with reference to FIG. 2, which shows N conventional switching converters connected in parallel. As noted above, the duty cycles of each of the N converters are equal, and they are symmetrically staggered in time. The result is that the first N-1 current harmonics completely cancel at each of the three external nodes. This in turn means that both input and output filters may be greatly reduced in size, thus effecting a reduction in cost, weight and size while reducing power losses within the filters as well as the source and the load circuits. As shown, the circuit is used as a boost converter, because the switches are connected to a node (circuit ground) common to the input and the output, but when the diodes are connected to the common node (circuit ground) instead, the circuit is used as a buck converter. And when the inductors are instead connected to the common node, the circuit is used as a buck-boost converter.

Since each of the N polyphase inductors carries one $N^{th}$ the current of an equivalent single-phase inductor, each N-phase inductor must therefore have N times the inductance if equivalent current form-factors are to be maintained. Since the $LI^2$ rating for each of the N inductors is therefore one $N^{th}$ that of a single-phase inductor, it follows that each of the N inductors is approximately one $N^{th}$ the size and weight of an equivalent single phase inductor. Accordingly, the total copper and iron required for the N polyphase inductors is approximately equal to that required for the one equivalent single-phase inductor. Adding phases therefore neither reduces the total inductor weight nor does it improve current form-factors associated with the individual switching devices, inductors and diodes. In summary, the advantages of multiphase switching converters are limited to reduced ripple currents and increased ripple frequencies at the external summing nodes.

A new element is therefore added to the conventional multiphase converter. The new element is, in essence, a negative coupling provided between pairs of inductors in what otherwise would be conventional multiphase converters as shown in FIG. 2. With optimal design, the advantages of conventional multiphase converters remain, but in addition, combinations of improved current form-factors and reduced total inductor masses are also made possible. The net result is that the coupled inductor multiphase converter achieves an improved power to weight ratio while reducing both peak switching currents and inductor losses.

An analysis of the current harmonics which flow through each of N inductors, while of some design value, is primarily of interest in demonstrating the basic principles by which negative coupling reduces the ripple currents through the inductors. For simplicity, a two-phase switching converter shown in FIG. 9 will be used. Since both the input and output filters typically look capacitive, it will be assumed that the input voltage, $V_1$, and the output voltage, $V_2$, are both constant dc voltages in the steady state.

By providing negative coupling between inductor pairs, peak currents through the switches can be reduced while reducing the inductor size and mass. Neglecting resistive and device losses, and assuming that current through the inductors is always nonzero (overcritical), it follows that $V_2 = \eta V_1$ where $\eta$ is the duty cycle of each switch. Furthermore, since $V_1$ and $V_2$ are assumed constant, the only interactions are between the coupled circuits; no interactions take place between the circuits which are not coupled. With this in mind, it suffices to analyze just two negatively coupled converters. These results easily extend for higher phase numbers.

Referring to FIG. 9, let $v_{L1}$ be the voltage across $L_1$, $i_{L1}$ the current through $L_1$ and $i_{L2}$ the current through $L_2$. From the definitions of self and mutual inductance, it follows that:

$$v_{L1} = \frac{L di_{L1}}{dt} + \frac{M di_{L2}}{dt} = L\left(\frac{di_{L1}}{dt} + K\frac{di_{L2}}{dt}\right) \tag{8}$$

where L is the self-inductance of both $L_1$ and $L_2$, M is the mutual inductance between $L_1$ and $L_2$ and K is the coupling coefficient.

$i_{L1}$ may be expressed by a Fourier Series:

$$i_{L1} = \sum_{n=1}^{\infty} I_n e^{in\omega t} \tag{9}$$

where $I_n$ are complex constants and $\omega$ is $2\pi$ divided by the switching period, T. Since $i_{L2}$ is identical to $i_{L1}$, except for a time shift of T/2, it follows that:

$$i_{L2} = \sum_{n=1}^{\infty} I_n e^{in\omega(t+T/2)} = \sum_{n=1}^{\infty} (-1)^n I_n e^{in\omega t} \tag{10}$$

$v_{L1}$ may be expressed as a Fourier Series:

$$v_{L1} = \sum_{n=1}^{\infty} V_n e^{in\omega t} \tag{11}$$

Combining equations (8) through (11) gives:

$$I_n = \frac{V_n}{in\omega L[1 + (-1)^n K]} \tag{12}$$

From equation (12) it is seen that positive values of K increase the odd harmonics and decrease the even harmonics, and negative values of K decrease the odd harmonics and increase the even harmonics.

Since the odd current harmonics greatly dominate over the even harmonics, it follows that a negative coupling coefficient which reduces the odd harmonics can be beneficial, even though the even harmonics are simultaneously increased. A more quantitative feel for the above may be found by explicitly solving for the complex constants, $V_n$ which appear in equation (11) from the following equation.

$$|V_n| = \frac{\sqrt{2} \; V_1 \sqrt{1 - \cos 2\pi n \eta}}{\pi n} \tag{13}$$

Combining equations (12) and (13), $$|I_n| = \frac{\sqrt{2} \; V_1 \sqrt{1 - \cos 2\pi n \eta}}{\pi n^2 \omega L[1 + (-1)^n K]} \tag{14}$$

Noting the $1/n^2[1+(-1)^n K]$ dependence of equation (14), it follows that the first two harmonics (n=1 and n=2) essentially determine the magnitude of the inductor ripple currents. Accordingly, a fair estimate for the optimal K value can be obtained by minimizing $|I_1|^2 + |I_2|^2$. Upon evaluation, the optimal value of K is found as −0.5.

By evaluating $|I_1|^2+|I_2|^2$ for K=0.5 and K=0, it is seen that the negative coupling reduces the ripple by about 11%. A subsequent, more detailed calculation which includes inductor reoptimization will show that the ripple is reduced by nearly 40%.

Equation (14) is an expression for the magnitude of the $n^{th}$ current harmonic which flows through each of the two coupled inductors for over-critical operation. Since the odd harmonics cancel while the even harmonics add, the current harmonics at node B are given by:

$$|I_n|_B = 0 \text{ for } n = 1, 3, 5 \ldots \quad (15a)$$

$$|I_n|_B = \frac{2\sqrt{2}\ V_1 \sqrt{1 - \cos 2\pi n\eta}}{\pi n^2 \omega L(1 + K)} \text{ for } n = 2, 4, 6 \ldots \quad (15b)$$

Note that making K negative increases the node B ripple. For example, with K= −0.50, the ripple doubles as compared with K=0. However, when compared with a single-phase regulator, the coupled inductor regulator still has lower node B ripple, as may be verified by equation (14).

If $I_{dc}$ is the average current which flows out of node B, the switch currents may be approximated by step currents which are zero when the switch is off and $I_{dc}/2$ when the switch is on. These step currents may in turn be expressed by a Fourier Series with the harmonic magnitudes, $|I_n'|$, given by an equation which analogous to equation (13):

$$|\Gamma_n| = \frac{\sqrt{2}\ I_{dc}\sqrt{1 - \cos 2\pi n\eta}}{2\pi n} \quad (16)$$

Since, again, the odd harmonics cancel and the even harmonics add, the current harmonics at node A are approximated by:

$$|\Gamma_n|_A = 0 \text{ for } n = 1, 3, 5 \ldots \quad (17a)$$

$$|\Gamma_n|_A = \frac{\sqrt{2}\ I_{dc}\sqrt{1 - \cos 2\pi n\eta}}{\pi n} \text{ for } n = 2, 4, 6 \ldots \quad (17b)$$

From equations (17a) and (17b), we note that the ripple currents at node A are essentially independent of K and L, but are proportionate to the node B dc current. Adding negative coupling has negligible effect on the node A ripple currents.

The node C currents are, of course, the negative sum of the A and B currents. Since the node A ripple currents typically dominate compared with the B currents, equations (17a) and (17b) generally provide a good approximation for the node C as well as the node A currents.

An analysis of the peak currents which flow through each of the N inductors is of primary consideration since peak currents determine switching device ratings as well as the required inductor gap. All of the simplifying assumptions above apply to this analysis. Accordingly, the following analysis will be restricted to the coupled two-phase converter of FIG. 9.

Referring to FIG. 9, and using the definitions for self and mutual inductance, it follows that:

$$v_{L1} = L\left(\frac{di_{L1}}{dt} + \frac{di_{L2}}{dt}\right) \quad (18a)$$

$$v_{L2} = L\left(\frac{di_{L2}}{dt} + K\frac{di_{L1}}{dt}\right) \quad (18b)$$

Solving equations (18a) and (18b) for $di_{L1}/dt$ gives:

$$\frac{di_{L1}}{dt} = \frac{v_{L1} - Kv_{L2}}{L(1 - K^2)} \quad (19)$$

Using equation (19) as a starting point, $i_{L1}(t)$ may be determined explicitly. Since the ac component of $i_{L1}$ is an odd function, i.e., $f(t) = -f(-t)$, it follows that:

$$I_p = \frac{I_{dc}}{2} + \frac{\Delta I}{2} \quad (20)$$

where $I_p$ is the peak current through either of the inductors and $\Delta I$ is the peak to peak current. From the following equation, $\Delta I$ is found as:

$$\Delta I = \frac{V_1 T\eta(1 - \eta + K\eta)}{L(1 - K^2)} \text{ for } 0 < \eta < .5 \quad (21a)$$

$$\Delta I = \frac{V_1 T(1 - \eta)(K + \eta - K\eta)}{L(1 - K^2)} \text{ for } .5 < \eta < 1 \quad (21b)$$

Equations (21a) and (21b) are plotted in FIG. 10. These two equations reach equal maxima of:

$$\Delta I' = \frac{V_1 T}{4L(1 - K^2)(1 - K)} \quad (22)$$

which occur for respective $\eta$ values of:

$$\eta_1 = \frac{1}{2} + \frac{K}{2(1 - K)} \text{ and } \eta_2 = \frac{1}{2} - \frac{K}{2(1 - K)} \quad (23)$$

The value of K which minimizes equation (22) is K= −⅓. Accordingly, the worst case peak to peak current with optimal coupling is:

$$\Delta I'' = \frac{0.2109\ V_1 T}{L} \quad (24)$$

With K=0, the peak to peak current is 0.25 $V_1 T/L$. Accordingly, the addition of optimal coupling reduces the peak to peak current by 16%. Discrepancies with the previous calculation using equations (8) through (17) are rationalized in that the previous calculation was an approximation dealing with only the first two current harmonics. It must be kept in mind that K= −⅓ is still not optimal. Optimization of the inductor design using the core structure of FIG. 8a or FIG. 8b may be achieved by proper selection of the coupling coefficient K, as illustrated by FIG. 10.

Referring to the two-gap coupled inductors of FIG. 8a, all core cross sections are of area A and the two gaps are each of length l. One inductor consists of $N_1$ turns on the left leg connected in series aiding with $N_2$ turns on the center leg. The second inductor consists of $N_1$ turns on the right leg in series aiding with $N_2$ turns on the center leg. Windings are such that the two $N_2$ coils are oppositely phased, as noted hereinbefore.

Negative coupling is provided by the two $N_2$ coils which share the center leg. As will be shown, the dc current component flowing in one inductor produces a core flux which, by action of the center leg coils, partly cancels the core flux produced by the dc current component flowing in the other inductance. This partial cancellation of dc flux components enables a reduction in the air gap which in turn provides for increased inductance (or, alternatively a size and weight reduction).

For the following analysis, values of L, M and K are calculated from Maxwell's equations as:

$$L = \gamma N_c^2 \tag{25a}$$

$$M = -\gamma(1 - \lambda) N_c^2 \tag{25b}$$

$$K = -(1 - \lambda^2) \tag{25c}$$

where
$\gamma = 4\pi \times 10^{-7}$ A/l in MKS units,
$N_c = N_1 + N_2$ and
$\gamma = N_1/N_c$ From equation (25c), it is readily seen that:

$$\lambda = \sqrt{1 + K} \tag{26}$$

The air gap is set at a value such that saturation flux is just approached for peak inductor currents. Using this relation, the air gap l is given by:

$$l = \frac{2\pi \times 10^{-7} \sqrt{1 + K}\, N_c I_{dc}}{B_{sat}\left[1 - \frac{(2 - \sqrt{1 + K})R}{(1 - K^2)(1 - K)}\right]} \tag{27}$$

where $R = V_1 T / 8 N_c A B_{sat}$.

substituting the above value for l in equation (25a) gives the inductance L:

$$L = \frac{2AN_c B_{sat}}{I_{dc}\sqrt{1 + K}}\left[1 - \frac{(2 - \sqrt{1 + K})R}{(1 - K^2)(1 - K)}\right] \tag{28}$$

Ripple is minimized by minimizing $\Delta I'$ in equation (22) while holding $N_c$, A, $I_{dc}$, $V_1$, T and $B_{sat}$ constant and allowing $\lambda$ (and hence K) to vary. Equation (22) is minimized by maximizing the denominator. This occurs when:

$$R = 0.5(1 - K^2)(3 + 5K) \tag{29}$$

Equation (29) is plotted in FIG. 11, from which it is shown that K may be approximated by the curve-fit $K_o = -(0.580 - 0.392R)$. FIG. 11 also plots the percent reduction in ripple current which occurs when K is changed from zero to $K_o$ (data is from equations (24), (26) and (28).

Referring now to the three-gap coupled inductor of FIG. 8b, windings and core cross sections are identical with those of the two gap scheme described above. Values of L, M and K are as follows:

$$L = \frac{2\gamma N_c^2}{3}(1 - \lambda + \lambda^2) \tag{30}$$

$$M = \frac{-\gamma N_c^2}{3}(2 - 2\lambda - \lambda^2) \tag{31}$$

$$K = \frac{-(2 - 2\lambda - \lambda^2)}{(2 - 2\lambda + 2\lambda^2)} \tag{32}$$

The air gap is set such that $B_{sat}$ is achieved at peak current:

$$l = \frac{2\pi \times 10^{-7}\lambda N_c I_{dc}}{B_{sat}\left[1 - \frac{(2\lambda + 1)R}{2(1 - \lambda + \lambda^2)(1 - K^2)(1 - K)}\right]} \tag{33}$$

Substituting equation (33) into equation (30) gives:

$$L = \frac{4AN_c B_{sat}}{3\lambda I_{dc}}\left[1 - \frac{(2\lambda + 1)R}{2(1 - \lambda + \lambda^2)(1 - K^2)(1 - K)}\right] \tag{34}$$

As for the two-gap coupled inductor, ripple is minimized by substituting the expression for L into equation (22) and finding the minimum value for $\Delta I'$ while holding $N_c$, A, $I_{dc}$, $V_1$, T, and $B_{sat}$ constant and letting $\lambda$ and K vary.

Since the resulting equation for $\Delta I'$ is too cumbersome to differentiate, a numerical approach was used to determine the values of K and $\lambda$ which minimize $\Delta I'$. This data is plotted in FIG. 12 from which it is shown that K may be approximated by $K_o = -(0.496 - 0.325R)$. FIG. 12 also plots the reduction in ripple current as compared with equivalent uncoupled inductors. Data for this latter curve was obtained by inserting the numerically derived optimal values of K and $\lambda$ into equations (22) and (34).

The data plots in FIGS. 11 and 12 serve well to compare performance of the two-gap and three-gap inductors:

1. For all values of R, the two-gap structure is superior in that peak currents are reduced by greater amounts.

2. For small values of R, the two-gap structure reduces ripple currents by about 38%, whereas the three-gap structure reduces ripple currents by about 34% —each as compared with conventional noncoupled inductors.

3. The two-gap structure is well suited for operation with high ripple currents (high values of R), whereas the three-gap structure is not.

4. For the two-gap structure, optimal $\lambda$ is typically about 0.70, whereas optimal $\lambda$ is typically 0.46 for the three-gap structure.

5. With $\lambda = 0.70$, the two-gap structure has near equal quantities of wire over each core leg. This is optimal in terms of packaging, copper cost, resistance and heat transfer.

6. With $\lambda = 0.46$, the three-gap structure has over twice as many center leg turns as end leg turns. Compared with the two-gap structure, this means that packaging size, copper quantity, resistance and hot-spot temperatures are all increased.

From the above analysis, it is thus seen that a two-phase switching converter system which employs negative coupling between inductances reduces ripple and improves inductor and switching device utilization, and reduces inductor losses, as noted hereinbefore. These results easily extend for higher order phase numbers. Such a higher order (N phase) converter is shown in FIG. 2 in a boost configuration for use in the system of FIG. 1, but other arrangements of such a multiphase converter may be used with negative coupled inductors, namely the buck and the buck boost. Consequently, it is intended that the claims be interpreted to cover such arrangements, examples of which are described below.

What is claimed is:

1. A single or multiphase chopper for operating a load from single or multiphase line energy with unity power factor, comprising a power section for converting single or multiphase alternating current line energy into direct current load energy including a rectifier, and for each chopper phase at least one inductor and one chopper switch for presenting said load with direct current, and duty cycle control mean for each chopper switch to control the average inductor current over each period of the chopper switch, and a sensing and control section including means for sensing at least one load parameter, means for producing a current command signal as a function of said parameter, means for sensing average current through every inductor included, means for producing a feedback signal as a function of said current command signal and the average rectifier voltage output over each period of every chopper switch included, and means for comparing said feedback signal with said sensed average current to produce, in response to a difference, a control signal applied to said duty cycle control means, whereby the instantaneous line current is maintained proportionate to the instantaneous line voltage, thus achieving a unity power factor.

2. The combination of claim 1 wherein a plurality of chopper switches are operated in staggered sequence for multiphase chopper operation, each chopper switch having a separate inductor, and wherein said duty cycle control means includes a separate control means for each chopper switch responsive to the same difference between said line voltage and said inductor current for staggered duty cycle control.

3. The combination of claim 2 wherein said multiphase inductors are negatively coupled in pairs to reduce chopper-generated ripple currents through said inductors, or to reduce the size of the inductors without increasing ripple currents, the inductors coupled in pairs being selected such that the beginning of the duty cycle of one falls half way between the beginning of the duty cycle of the other.

4. The combination of claim 3 including an E core having two outer legs and a center leg between the outer legs, and an I core for each pair of coupled inductors, and wherein each pair of inductors negatively coupled are wound on legs of an E core with one inductor having a coil of $N_1$ turns on one outer leg connected in series aiding with a coil of $N_2$ turns on the center leg, and the second inductor consists of a coil of $N_1$ turns on the other outer leg connected in series aiding with a coil of $N_2$ turns on the center leg, and the sense of the two coils of $N_2$ turns are oppositely phased for negative coupling, said I core being positioned opposite the ends of said legs with a gap between the I core and at least the outer legs.

5. The combination of claim 4 wherein said I core forms gaps with only the outer legs.

6. The combination of claim 5 wherein said I core forms gaps with both the outer legs and the center leg.

7. In a system for charging a battery, said system having at least one converter comprised of a duty cycle controlled chopper switch and inductor for translating energy from an alternating current line to a direct current into said battery, said system also having means for rectifying said alternating current into said converter, an improvement for operation of said system with a unity power factor consisting of means for feedback control of the duty cycle for the chopper switch such that the average inductor current over each period of the chopper switch is proportionate to the average voltage output of said rectifying means during the same chopper switch period, whereby instantaneous line current is maintained proportionate to the instantaneous line voltage for unity power factor, said feedback control means being comprised of means for sensing at least one parameter of said battery, means responsive to said sensing means for producing a charge current command signal, means for producing a signal that is the product of the average voltage of said line during a chopper switch period and said current command signal, means for sensing current through said inductor, means for comparing said inductor current with said product signal, and means for controlling the duty cycle of said chopper in response to the difference between said line voltage and said inductor current.

8. The combination of claim 7 wherein said system includes a plurality of converters in parallel but operated in staggered sequence for multiphase operation, each converter having a separate inductor, and wherein said duty cycle means includes a separate control means for each converter responsive to the same difference between said line voltage and said inductor current for staggered duty cycle control.

9. The combination of claim 8 wherein inductors of said multiphase converters are negatively coupled in pairs to reduce chopper-generated ripple currents through said inductors, or to reduce the size of the inductors without increasing ripple currents, the inductors coupled in pairs being selected such that the beginning of the duty cycle of one falls half way between the beginning of the duty cycle of the other.

10. The combination of claim 9 including an E core having two outer legs and a center leg between the outer legs, and an I core for each pair of coupled inductors, and wherein each pair of inductors negatively coupled are wound on legs of an E core with one inductor having a coil of $N_1$ turns on one outer leg connected in series aiding with a coil of $N_2$ turns on the center leg, and the second inductor consists of a coil of $N_1$ turns on the other outer leg connected in series aiding with a coil of $N_2$ turns on the center leg, and the sense of the two coils of $N_2$ turns are oppositely phased for negative coupling, said I core being positioned opposite the ends of said legs with a gap between the I core and at least the outer legs.

11. The combination of claim 10 wherein said I core forms gaps with only the outer legs.

12. The combination of claim 10 wherein said I core forms gaps with both the outer legs and the center leg.

13. In a system for converting ac or dc energy to dc energy using a plurality of duty cycle controlled converters connected in parallel, and cyclically operating said converters in phase staggered sequence such that the duty cycles of the converters are evenly spaced apart, each converter being comprised of a chopper switch and an inductor, an improvement consisting of negative coupling of said inductor in each converter to an inductor in another converter selected to cancel odd current harmonics in the two inductors so coupled, thereby to reduce ripple in the dc output of said system.

14. The improvement defined by claim 13 wherein said inductors coupled are selected in pairs such that the beginning of the duty cycle of one falls half way between the duty cycle of the other.

15. The improvement defined by claim 14 including an E core having two outer legs and a center leg between the outer legs, and an I core for each pair of coupled inductors, and wherein each pair of inductors negatively coupled are wound on legs of an E core with one inductor having a coil of $N_1$ turns on one outer leg connected in series aiding with a coil of $N_2$ turns on the center leg, and the second inductor consists of a coil of $N_1$ turns on the other outer leg connected in series aiding with a coil of $N_2$ turns on the center leg, and the sense of the two coils of $N_2$ turns are oppositely phased for negative coupling, said I core being positioned opposite the ends of said legs with a gap between the I core and at least the outer legs.

16. The improvement defined by claim 15 wherein said I core forms gaps with only the outer legs.

17. The improvement defined by claim 15 wherein said I core forms gaps with both the outer legs and the center leg.

* * * * *